US009816655B2

(12) United States Patent
Crompton et al.

(10) Patent No.: US 9,816,655 B2
(45) Date of Patent: Nov. 14, 2017

(54) ROTATION LOCKING PUSH-TO-CONNECT FITTING DEVICE, SYSTEM AND METHOD

(71) Applicant: Quick Fitting, Inc., Warwick, RI (US)

(72) Inventors: David B. Crompton, Tiverton, RI (US); Libardo Ochoa Dias, Pawtucket, RI (US); Herbert J. Bouchard, West Greenwich, RI (US)

(73) Assignee: Quick Fitting, Inc., Warwick, RI (US)

( * ) Notice: Subject to any disclaimer, the term of this patent is extended or adjusted under 35 U.S.C. 154(b) by 13 days.

(21) Appl. No.: 14/564,714

(22) Filed: Dec. 9, 2014

(65) Prior Publication Data
US 2016/0161038 A1 Jun. 9, 2016

(51) Int. Cl.
*F16L 37/091* (2006.01)

(52) U.S. Cl.
CPC ......... *F16L 37/091* (2013.01); *F16L 37/0915* (2016.05); *Y10T 29/49826* (2015.01)

(58) Field of Classification Search
CPC ....... F16L 37/091; F16L 37/084; F16L 37/26; F16L 37/0915; Y10T 29/49826

USPC .......................................... 285/340, 39, 351
See application file for complete search history.

(56) References Cited

U.S. PATENT DOCUMENTS

| | | | |
|---|---|---|---|
| 6,352,439 B1* | 3/2002 | Stark et al. | 439/142 |
| 8,205,915 B1* | 6/2012 | Crompton et al. | 285/340 |
| 2003/0057701 A1* | 3/2003 | Koo | 285/307 |
| 2003/0067170 A1* | 4/2003 | Snyder et al. | 285/340 |
| 2008/0309081 A1* | 12/2008 | De Wilde | F16L 37/091 |
| | | | 285/340 |
| 2009/0278346 A1* | 11/2009 | O'Brien | F16L 37/091 |
| | | | 285/23 |
| 2014/0021717 A1* | 1/2014 | Burke et al. | 285/321 |
| 2014/0062078 A1* | 3/2014 | Weissmann | F16L 13/116 |
| | | | 285/80 |

\* cited by examiner

*Primary Examiner* — Gregory Binda
*Assistant Examiner* — Zachary Dragicevich
(74) *Attorney, Agent, or Firm* — Williams Mullen, PC; Thomas F. Bergert

(57) ABSTRACT

A push fitting joint packaging arrangement allows for rotation locking as between a fitting and an inserted pipe or tubing element. In various embodiments, the arrangement comprises one or more sealing members, a fastening ring with one or more prolated ear members, a tube support member and a push release member.

19 Claims, 5 Drawing Sheets

ROTATION LOCKING PUSH-TO-CONNECT FITTING DEVICE, SYSTEM AND METHOD

FIELD OF THE INVENTION

The present invention relates to push-to-connect fittings, and more particularly to a rotation locking push-to-connect fitting device, system and method.

BACKGROUND

Piping systems exist to facilitate the flow of fluids (e.g., liquid, steam, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride) and PEX (cross-linked polyethylene). For purposes of the present disclosure, the terms "pipe", "piping", "tube" or "tubing" will be understood to encompass one or more pipes, tubes, piping elements and/or tubing elements, and may be used interchangeably.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems to reduce the dangers and time involved in soldering joints. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro® line of push fittings and related products. Also, such technology is described, for example, in U.S. Pat. Nos. 7,862,089, 7,942,161, 8,205,915, 8,210,576, 8,398,122, 8,480,134, 8,844,974 and 8,844,981, the disclosures of which are incorporated herein by reference in their entireties.

Among other specific issues, push fitting technologies generally have no stopping force for resisting or preventing the rotation of the fitting about an inserted tubing element. In various applications, such as with hard materials including stainless steel and copper, it is desirable to prevent the fitting from rotating about the inserted tubing element for stability, strength, durability and overall operation.

SUMMARY OF ASPECTS OF THE PRESENT INVENTION

The present invention provides, in part, a push fitting assembly package that facilitates the re-use of push fittings without damage to the fitting elements or the pipe. The present invention connects piping using no tools, clamps, solder or glues, while creating a leak-free seal at the connected joining area. Further, unlike prior methods, the present invention can join both like and unlike piping elements in any combination, and without coining or threading the elements into place. The present invention can reduce the amount of force required to connect and disconnect piping elements from the device of the present invention, and can further provide a device and one or more elements that prevent the fitting from rotating about an inserted tubing element. In various embodiments, the present invention can assist in applications involving high hardness tubing, such as stainless steel or copper tubing, for example, which may be involved in various fire suppression applications, for example.

The quick connection pipe joint assembly package provided as part of the present invention can employ a release pusher member that, when removed, exposes the clamping, sealing and fastening mechanisms of the fitting. The release pusher member, also called the "release pusher" moves axially and can push the fastening ring of the present invention in order to facilitate the release of a cylindrical object such as a piping element held within the fitting.

For purposes of the present disclosure, a fitting (also referred to as a body member) can encompass a valve member and other piping elements including, but not limited to: a coupling joint, an elbow joint, a tee joint, a stop end, a ball valve member, tubing and other objects having cylindrical openings. In one embodiment of the present invention, one or more sealing member gasket inserts (e.g., O-ring members) fit within a first sealing ring compartment defined in the interior wall of the fitting. In addition, at each pipe receiving end of the fitting, a tube support member compartment is machined into the interior wall to retain at least a portion of the body of the fastening ring. The interior housing elements provide integrated support for the sealing member(s) and fastening ring when opposing force is applied to piping elements that have been inserted into the fitting. In one embodiment, a tube support member is employed to provide additional support for the fastening ring and to cooperate with the release pusher to facilitate connection and disconnection of piping elements with less required force. The tube support member further maintains the fastening ring in place against elements of the fitting inner wall.

Aspects of the present invention provide a novel push fitting joint packaging arrangement comprising a fastening ring having one or more prolated ear members and a tube support member compartment adapted to receive the one or more ear members in order to prevent the fastening ring and thus the fitting from rotating about an inserted tube member. In various embodiments, the one or more ear members can extend from respective and opposite circumferential ends of the outer edge of the fastening ring base. The tube support member can be positioned adjacent the fastening ring and thereby hold the fastening ring in place when the package is assembled in the fitting.

The release pusher provided as part of embodiments of the present invention is employed to facilitate the release of tubing, piping and other cylindrical objects inserted into a fitting. The release pusher is manually pushed into the cavity formed by the tube support member within the fitting body and tapered edges of the release pusher generally or nearly abut the installed fastening ring. When it is desired to release an inserted pipe, for example, from the fitting, the release pusher can be forced in the direction of the fastening ring such that its angular surfaces depress the fastening ring teeth off of the surface of the inserted pipe, thereby allowing the pipe to be removed.

DETAILED DESCRIPTION OF EMBODIMENTS

Figure 1:
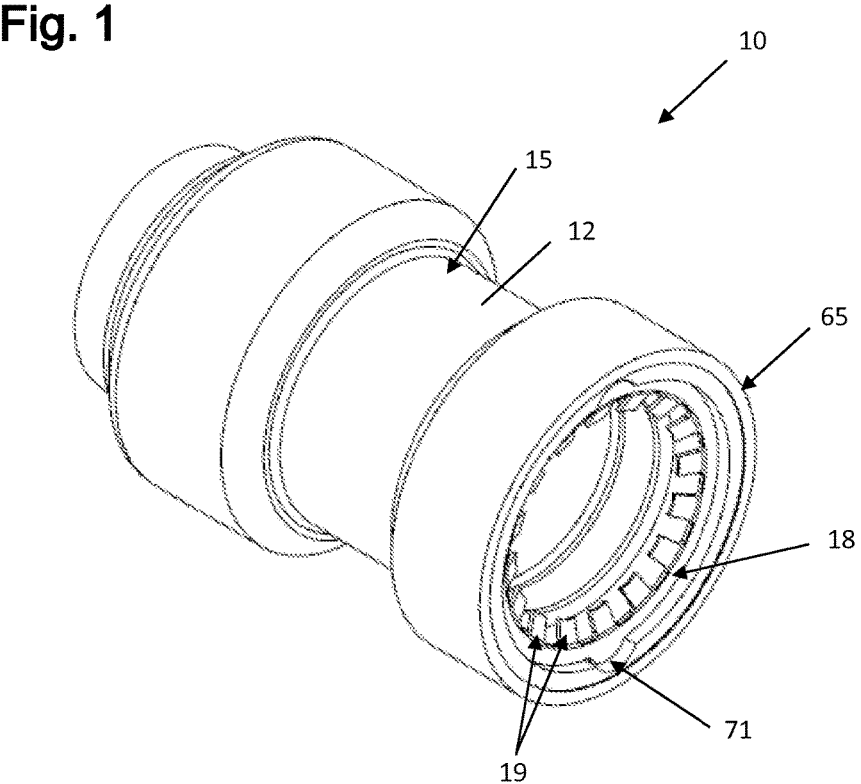
FIG. 1 is a top right perspective view of an integrated fitting in accordance with embodiments of the present invention.

In the push-fit piping joint assembly 10 of one embodiment of the present invention as shown in FIGS. 1 through 6, elements of the joint assembly as shown include: a fitting (i.e., fitting body member) 12 having an inner wall 13 and outer wall 15, a fastening ring 18, one or more sealing members 14 (which can be optionally lubricated) and a release pusher 20. A tube support member 23 can also be provided in various embodiments. The fitting interior wall 13 defines a cavity 45 extending axially through the fitting and includes a first interior wall portion 50 defining a first section cavity 52, a sealing ring compartment 54, a fastening ring wall support portion 56 and a tube support member compartment 58. In various embodiments of the present invention, the compartments 54 and 58, and the support portion 56 are formed as part of the inner surface of the fitting 12 through hydroforming or similar methods. As further shown in FIG. 4, a tube stop element 75 is formed with and extends radially inwardly from the interior wall 13, and the tube stop element 75 acts as an end wall for a piping element when the piping element is inserted into the fitting of the present invention. A first packing arrangement 92 inserted into the cavity 52 engages the first interior wall portion 50 of the fitting 12, and a second packing arrangement 94 can be inserted into a second section cavity 93 so as to engage a second interior wall portion 95 of the fitting. The first 92 and second 94 packing arrangements can each comprise at least one sealing ring, and a fastening ring having at least one radially extending locking ear member, in various embodiments of the present invention.

Figure 2:
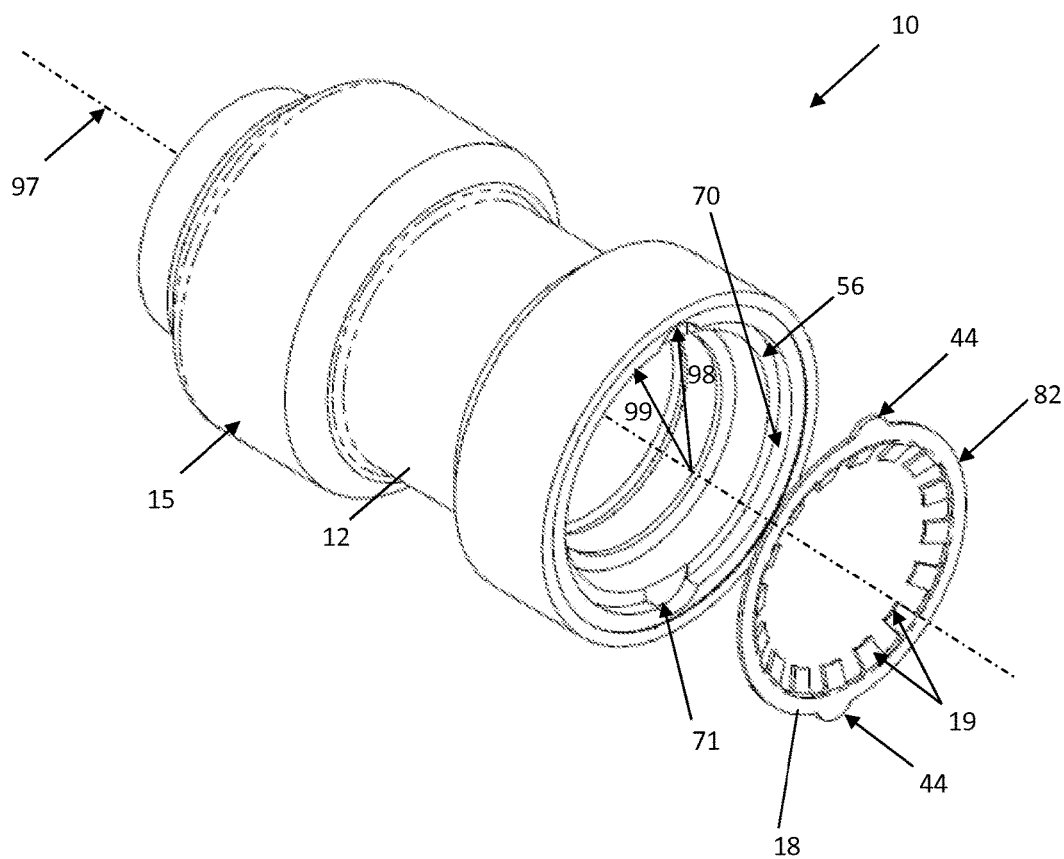
FIG. 2 is a top right perspective view of an integrated fitting with detached fastening ring, in accordance with embodiments of the present invention.
Figure 3:
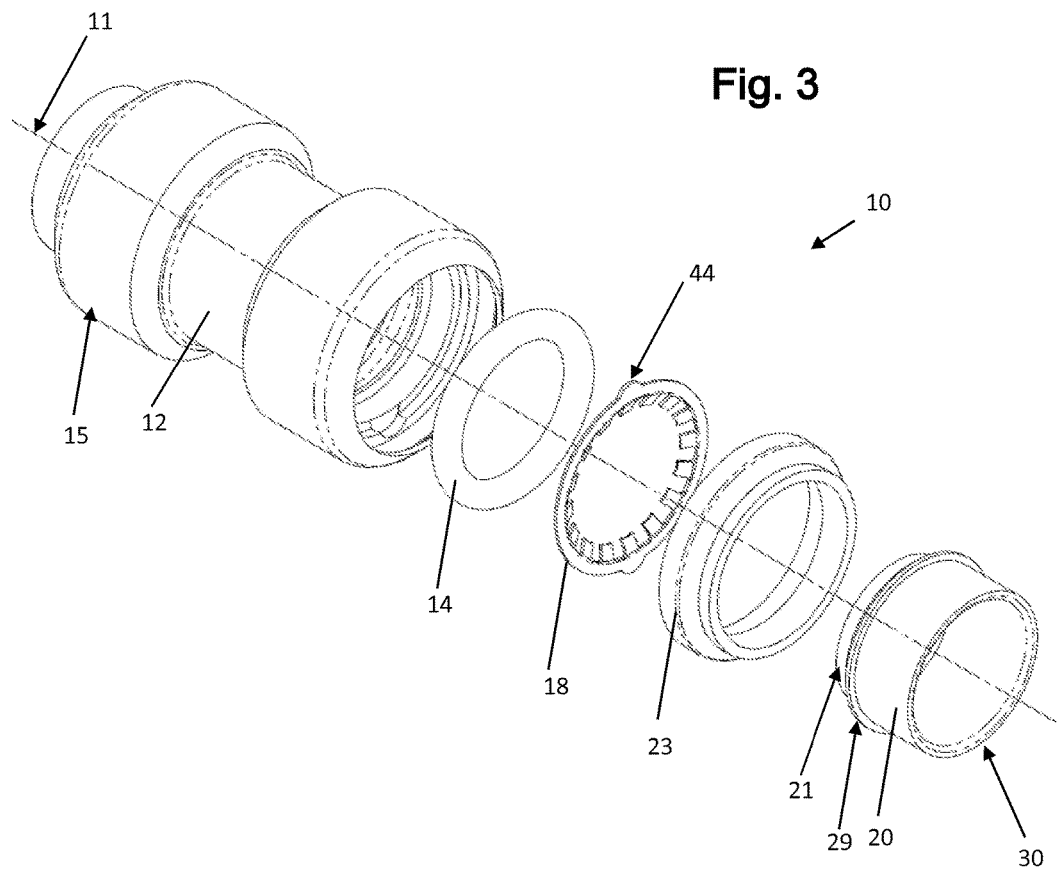
FIG. 3 is an exploded perspective view of an integrated fitting in accordance with embodiments of the present invention.
Figure 4:
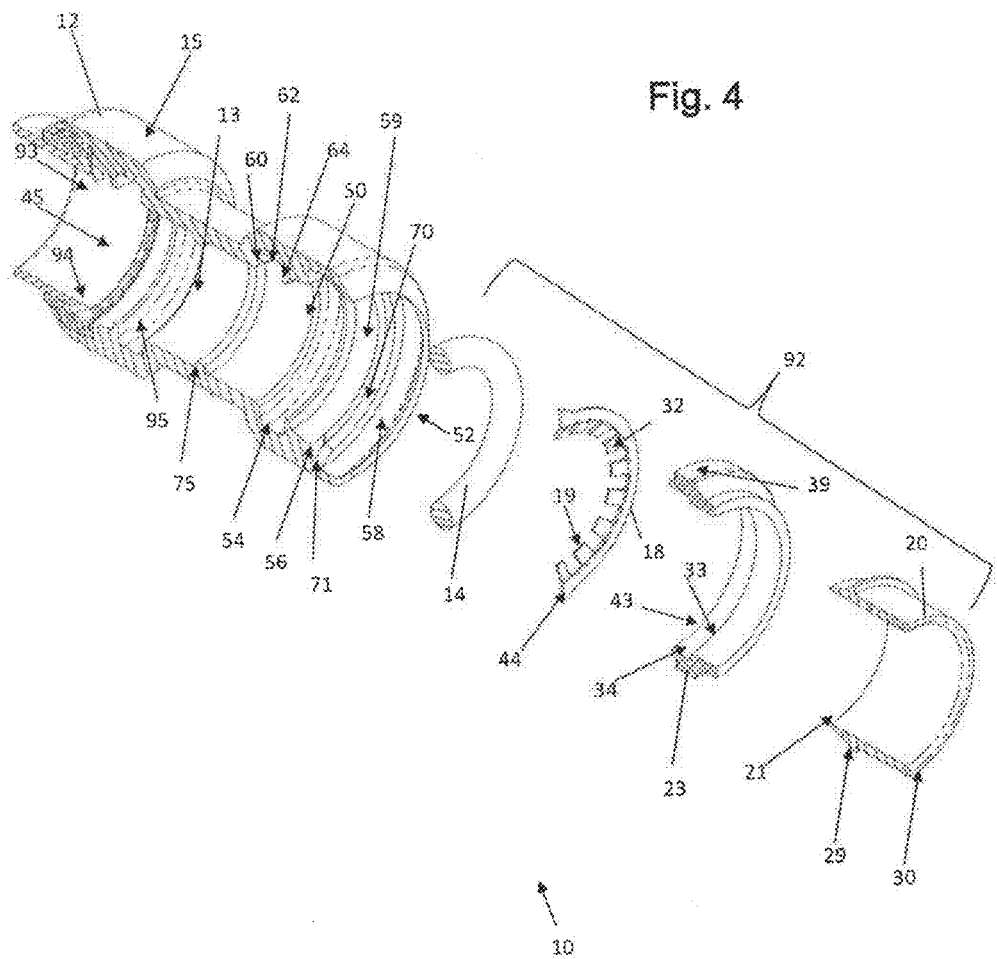
FIG. 4 is a cross-sectional view of the integrated fitting of FIG. 3.

As further shown in FIG. 4, compartment 54 is defined by a front end wall 60, a bottom wall 62 and the back end wall 64, and provides an internal housing for one or more sealing members 14. Compartment 58 can be defined similar to compartment 218 as shown, for example, in FIG. 33 of U.S. Pat. No. 8,844,981, incorporated by reference herein in its entirety. As shown in FIG. 4, fastening wall support portion 56 extends radially outwardly from a teeth-engaging portion 59 of inner wall 13 to a step portion 70 of inner wall 13. In various embodiments, step portion 70 comprises an axially extending surface having an inconsistent radial distance from the interior axis 11 of the fitting 12. Rather, as shown in FIGS. 2 and 4, step portion 70 can increase in radial distance at one or more slot portions 71 of step portion 70, such as where radial distance 98 is larger than radial distance 99 from interior axis 97 in FIG. 2. As shown in FIGS. 1 through 4, slot portions 71 are substantially arc-shaped. However, it will be appreciated that the shape of slot portions 71 can be square, rectangular or other shape without departing from the scope of the embodiments of the present invention. In various embodiments, the slot portion(s) 71 is machined during formation of the fitting 12 using a bit employed to provide the specific shape desired.

Figure 5:
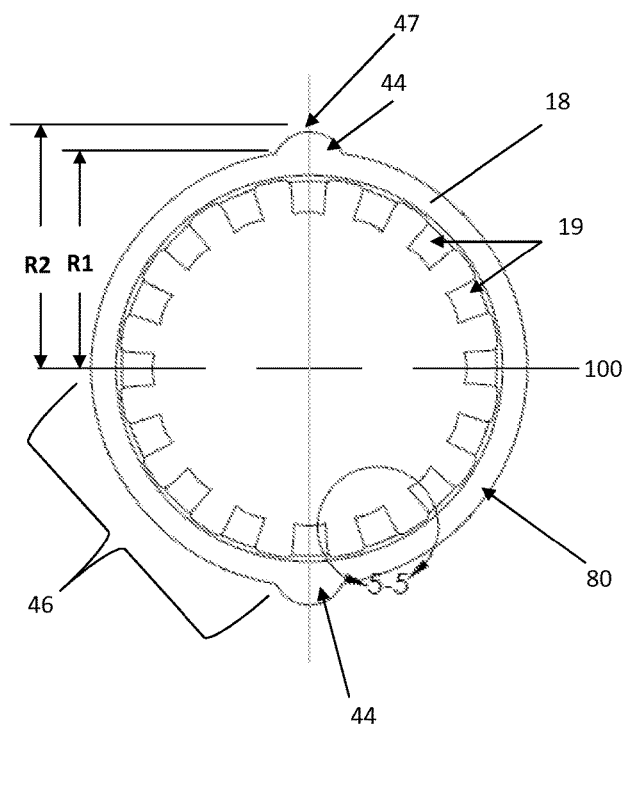
FIG. 5 is a front elevational view of a fastening ring in accordance with embodiments of the present invention.
Figure 6:
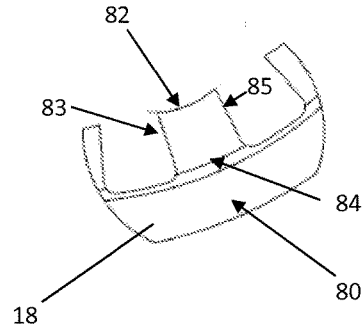
FIG. 6 is a detailed view of encircled portion 5-5 of FIG. 5.

The fastening ring 18 can comprise a spring steel formulation, for example, that enables the fastening ring to be malformed during installation, while springing back into its originally manufactured position once installed. The fastening ring 18 is capable of grabbing an inserted pipe's surface via two or more teeth 19 to ensure connections cannot be pulled apart. As shown in FIGS. 1 through 6, embodiments of the fastening ring 18 include a substantially cylindrical base 80 that has a plurality of bifurcated or square edged teeth 19 extending inwardly from and along the base 80. In various embodiments, each tooth can have a substantially squared off shape, including a top edge 82, a left edge 83, a bottom edge 84 and a right edge 85. As shown in FIG. 6, the teeth 19 of the fastening ring 18 can be provided with an inner edge 82 that is curved in order to accommodate a substantially cylindrically shaped tube inserted into the assembly of embodiments of the present invention. Further, the bottom edge 84 of each tooth is integrally connected to the circumferential base 80 of the fastening ring 18. The number of teeth can readily vary in number and size.

In various embodiments of the present invention, the fastening ring 18 can be provided with one or more prolated ear members 44 extending from one or more areas of the common outer edge 46 of the fastening ring base 82. As shown in FIG. 5, for example, the common outer edge 46 has a radius R1 from center line 100 and the outer peak edge 47 of the prolated ear members 44 has a radius R2 from center line 100, wherein R2 is greater than R1. In this way, the prolated ear members 44 are adapted to slidingly mate with and be retained within slot portions 71 of inner surface 13 of the fitting 12. The tube support member 23 can be positioned adjacent the fastening ring 18 and thereby hold the fastening ring in place when the package is assembled in the fitting 12. While ear members 44 are shown as being arc-shaped in FIGS. 1 through 6, it will be appreciated that other shapes can be employed and work equally well. Other shapes employed for the ear members 44 are necessarily accommodated by equally and oppositely shaped slots 71 in the inner portion 13 of the fitting 12.

In various embodiments, the fastening ring teeth 19 are angled downwardly from the substantially cylindrical perimeter of the ring, toward the fitting interior and away from the fitting edge 65 when installed, such that when a pipe or tubing is inserted, the teeth exert a pressure against the pipe to discourage the pipe from slipping or moving back out of the fitting. No wrenches, solder, welding, glue and/or twisting and turning the elements are required to form a connection.

The release pusher 20 can be provided with elements as described, for example, in U.S. Pat. No. 8,844, 981, the disclosure of which is incorporated by reference herein in its entirety. When pressure is applied on the back side 30 of the release pusher 20, the external tip 21 can engage the inside surface 32 of the fastening ring teeth 19 as will be described in more detail below, and a ledge back wall 29 can removably engage a retaining lip 33 extending radially inwardly of a base wall 34 of the tube support member 23 at the axially outermost position of the fitting, as shown in FIG. 4. The release pusher can comprise an injection-molded plastic material or a metal material such as brass, for example.

During removal, a tool such as a specially adapted wrench, for example, can be applied to the outer top surface of the release pusher so as to exert a pushing and lifting force that causes the release pusher outer ledge to disengage the retaining lip 33. Once the release pusher is removed, the internal packing arrangement components are exposed for optional removal and/or replacement.

The fastening ring 18, sealing member 14, tube support member 23 and release pusher 20, taken individually, in aggregate, or in subset combinations, provide different embodiments of packing arrangements in accordance with the present invention, and each has an internal diameter that allows for smooth and snug engagement of a piping or tubing element external surface (not shown). In various embodiments, the interior diameters of the fastening ring 18 (as measured to the teeth 19 and not the ring cylindrical base 80) and sealing member 14 are substantially the same, and the interior diameters of the fitting 12 and the release pusher 20 are substantially the same. Further, the interior diameters of the fastening ring 18 and sealing member 14 are slightly less than that of the fitting 12 and release pusher 20 so as to facilitate proper operation of the present invention. The release pusher 20 is substantially cylindrical and includes an external tip 21 at the fastening ring engaging end thereof.

In operation, a fitting 12 is provided and one or more sealing rings (a.k.a., O-ring) 14 are inserted into compartment 54. It will be appreciated that, when two or more sealing rings are inserted into compartment 54, the rings can be situated side-by-side so as to physically abut one another in adjacent engagement. Such an arrangement can facilitate the sealing function of this aspect of the present invention by providing additional surface connection between the rings 14 and the surface of the inserted piping. Next, fastening ring 18 is inserted into opening 52 such that the base 80 of fastening ring 18 abuts surface 56, and such that ear member(s) 44 slidingly engage and fit within slot portion(s) 71. Next, tube support member 23 is inserted such that front edge 43 engages the fastening ring base portion 80 and assists in retaining base portion 80 against wall portion 56 of fitting 12. This helps the fastening ring maintain strength and prevents the fastening ring from being pulled through cavity 45 under significant force when a tube or piping element is inserted. This further helps reduce the amount of force required to insert and remove a tubing element. The outer wall 39 of the tube support member 23 is snugly retained within compartment 58. Next, the release pusher member 20 is inserted into opening 52 such that ledge 29 slides over and engages the retaining lip 33 of the tube support member 23. The ledge 29 is then retained in a position whereby it cannot move back out of the opening 52 because it rests against the lip 33 of tube support member 23. Nevertheless, the ledge 29 can be pushed axially inwardly of the fitting, as the ledge slidingly engages the radially outermost portion of the tube support member inner wall. Such action allows the release pusher 20 to engage the teeth 19 of the fastening ring 18 and push the teeth 19 into contact with the teeth-engaging portion 59 of inner wall 13. In this way, an inserted pipe can be easily inserted into and/or removed from the fitting 12. After the sealing member(s) 14, fastening ring 18, tube support member 23 and release pusher member 20 are secured within the fitting interior, a pipe member can be inserted into cavity 45 and through each of members 14, 18, 23 and 20 and can be securely maintained within the pipe fitting 12 through the action of the sealing member(s) 14 and fastening ring 18.

In various embodiments of the present invention, the fitting 12 can be formed with an indentation in the exterior wall/edge 65 to assist in establishing areas for different piping elements to engage the fitting, and can further be formed with a multi-surfaced (e.g., hexagonal, octagonal, etc.) head to facilitate threading in the threaded interior embodiment. In various embodiments of the present invention, a second O-ring or sealing ring can be positioned within the sealing ring compartment as described elsewhere herein. In another embodiment of the present invention, the fastening ring and/or the tube support member can be split so as to facilitate positioning within the fitting. In various embodiments, the fitting 12 can be forged CW617N brass, with full porting and full flow fitting, for example. The lubricant for the sealing member(s) 14 can be a food grade lubricant, for example. It will be appreciated that the sealing member(s) can comprise a flat ring or washer-type seal member in addition or as an alternative to a circular member of substantially circular cross-section.

It will be appreciated that the embodiment of the present invention as shown and described herein relies upon few parts while requiring relatively low connection and release pressure. For example, prior joint assemblies can require anywhere from twenty-two to thirty-two pounds of force to insert a tube into the fitting containing the assembly, and can require thirty pounds or more of force to separate. With the present arrangement as shown in the drawings and described herein, a tubing element can be inserted and separated with as little as seven pounds of force. Further, the decreased force requirements are not accompanied by decreased retention abilities, as the assembly of the embodiments of the present invention maintains the same retention power as prior assemblies. Further, the assembly of the embodiments of the present invention prevents rotation of the fitting about an inserted tube. In addition, as a tube can be inserted with higher velocity and lower pressure, it will generate a clicking or snapping sound as it meets tube stop element 75. The combination of reduced force requirements and stable retention of the fastening ring assists in lowering maintenance and replacement costs for the present invention, as the fastening ring is much less prone to, if not prevented from, being pulled into the cavity 45 when a tube element is inserted. It will further be appreciated that, in various embodiments of the present invention, the members of the push connect joint assembly are formed through hydroforming processes.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A push-to-connect joint assembly, comprising:
   a single body fitting having an interior axis, an interior wall and an exterior wall, wherein the interior wall defines a cavity extending axially through the fitting, a sealing ring compartment, a fastening ring wall support portion and a tube support member compartment, wherein the sealing ring compartment is axially inward of the fastening ring wall support portion, wherein the fastening ring wall support portion is axially inward of the tube support member compartment and extends radially outwardly from a teeth-engaging portion to an axially extending step portion, wherein the step portion comprises an axially extending surface having an inconsistent radial distance from the interior axis, wherein the step portion includes a fastening ring common outer edge engaging surface and at least one fastening ring ear retaining slot, wherein the ear retaining slot extends a further radial distance from the interior axis than the common outer edge engaging surface;
   a first sealing ring positioned within the sealing ring compartment;
   a fastening ring having a base portion and teeth, wherein the base portion is positioned at least partially within the tube support member compartment and has a radially outer edge in contact with the fitting interior wall, wherein the radially outer edge includes a common outer edge portion having a first radius, and at least one prolated ear member having a second radius that is larger than the first radius, wherein the common outer edge portion is in mating engagement with the common outer edge engaging surface of the step portion, and further wherein the at least one prolated ear member is in mating engagement with the at least one ear retaining slot of the step portion; and
   a tube support member having a front edge and an inner wall, wherein the tube support member is positioned within the tube support member compartment such that the front edge abuts the base portion of the fastening ring.

2. The assembly of claim 1, further including a release pusher member slidably maintained against the tube support member inner wall.

3. The assembly of claim 2 wherein the release pusher is positioned radially inwardly of the tube support member within the fitting.

4. The assembly of claim 1 wherein the fitting includes a tube stop element extending radially inwardly from the interior wall.

5. The assembly of claim 1 further including a second sealing ring positioned adjacent the first sealing ring within the sealing ring compartment.

6. The assembly of claim 1 wherein the prolated ear member is substantially arc-shaped.

7. A method for assembling a push-to-connect joint assembly, comprising:
   providing a single body fitting having interior axis, an an interior wall and an exterior wall, wherein the interior wall defines a cavity extending axially through the fitting, a sealing ring compartment, a fastening ring wall support portion and a tube support member compartment, wherein the sealing ring compartment is axially inward of the fastening ring wall support portion, wherein the fastening ring wall support portion is axially inward of the tube support member compartment and extends radially outwardly from a teeth-engaging portion to an axially extending step portion, wherein the step portion comprises an axially extending surface having an inconsistent radial distance from the interior axis, wherein the step portion includes a fastening ring common outer edge engaging surface and at least one fastening ring ear retaining slot, wherein the ear retaining slot extends a further radial distance from the interior axis than the common outer edge engaging surface;
   positioning a first sealing ring within the sealing ring compartment;
   inserting a fastening ring within the tube support member compartment, wherein the fastening ring has a base portion and teeth, wherein the base portion is positioned at least partially within the tube support member compartment and has a radially outer edge in contact with the fitting interior wall, wherein the radially outer edge includes a common outer edge portion having a first radius, and at least one prolated ear member having a second radius that is larger than the first radius, wherein the common outer edge portion is in mating engagement with the common outer edge engaging surface of the step portion, and further wherein the at least one prolated ear member is in mating engagement with the at least one ear retaining slot of the step portion; and
   positioning a tube support member within the tube support member compartment, wherein the tube support member has a front edge and an inner wall, and wherein the tube support member is positioned such that the front edge abuts the base portion of the fastening ring.

8. The method of claim 7, including the step of providing a release pusher member slidably maintained against the tube support member inner wall.

9. The method of claim 8 wherein the release pusher is positioned radially inwardly of the tube support member within the fitting.

10. The method of claim 7 wherein the fitting includes a tube stop element extending radially inwardly from the interior wall.

11. The method of claim 7 including the step of positioning a second sealing ring positioned adjacent the first sealing ring within the sealing ring compartment.

12. The method of claim 7 wherein the prolated ear member is substantially arc-shaped.

13. The method of claim 7 wherein the fitting has an interior axis, and wherein the fitting interior wall has a teeth-engaging portion and a step portion, wherein the fastening ring wall support portion extends radially outwardly from the teeth-engaging portion to the step portion, and wherein the step portion comprises an axially extending surface having an inconsistent radial distance from the interior axis of the fitting.

14. A push-to-connect fitting, comprising:
a single body fitting having an interior wall and an exterior wall, wherein the interior wall defines a cavity extending axially through the fitting along an internal axis, and wherein the interior wall includes a first interior wall portion defining a sealing ring compartment, a fastening ring wall support portion and a tube support member compartment, wherein the sealing ring compartment is axially inward of the fastening ring wall support portion, wherein the fastening ring wall support portion extends radially outwardly from a teeth-engaging portion to an axially extending step portion, wherein the step portion comprises an axially extending surface having an inconsistent radial distance from the internal axis, wherein the step portion includes a fastening ring common outer edge engaging surface and at least one fastening ring ear retaining slot, wherein the ear retaining slot extends a further radial distance from the interior axis than the common outer edge engaging surface;
a fastening ring having a base portion and teeth, wherein the base portion has a radially outer edge in contact with the fitting interior wall, wherein the radially outer edge includes a common outer edge portion having a first radius, and at least one prolated ear member having a second radius that is larger than the first radius, wherein the common outer edge portion is in mating engagement with the common outer edge engaging surface of the step portion, and further wherein the at least one prolated ear member is in mating engagement with the at least one ear retaining slot of the step portion.

15. The fitting of claim 14, wherein the step portion increases in radial distance from the internal axis at one or more slot portions.

16. The fitting of claim 15 wherein the one or more slot portions is arc-shaped.

17. A push-to-connect fitting, comprising:
a single body fitting having an interior wall and an exterior wall, wherein the interior wall defines a cavity extending axially through the fitting and includes first and second interior wall portions separated by a tube stop element extending radially into the cavity from the interior wall, wherein the fitting further has an interior axis, and wherein each of the fitting interior wall portions has a sealing ring compartment, a fastening ring wall support portion and a tube support member compartment, wherein the sealing ring compartment is axially inward of the fastening ring wall support portion, wherein the fastening ring wall support portion extends radially outwardly from a teeth-engaging portion to a step portion, and wherein the step portion comprises an axially extending surface having an inconsistent radial distance from the interior axis of the fitting, wherein the step portion includes a fastening ring common outer edge engaging surface and at least one fastening ring ear retaining slot, wherein the ear retaining slot extends a further radial distance from the interior axis than the common outer edge engaging surface;
a first packing arrangement inserted into the cavity so as to engage the first interior wall portion of the fitting;
a second packing arrangement inserted into the cavity so as to engage the second interior wall portion of the fitting; and
wherein the first and second packing arrangements each comprise at least one sealing ring in each sealing ring compartment, a tube support member in each tube support member compartment and a fastening ring having a base portion with a radially outer edge, wherein the radially outer edge has a common outer edge portion having a first radius, and at least one prolated ear member having a second radius that is larger than the first radius, wherein the common outer edge portion is in mating engagement with the common outer edge engaging surface of the step portion, wherein the at least one prolated ear member is in mating engagement with the at least one ear retaining slot of the step portion, wherein each tube support member has a front edge and an inner wall, and wherein the tube support member front edge abuts the base portion of the fastening ring.

18. The fitting of claim 17 wherein the first and second packing arrangements further include a release pusher member.

19. The fitting of claim 17 wherein the first and second packing arrangements each include at least two sealing rings in each sealing ring compartment.

* * * * *